(12) United States Patent
Czachor

(10) Patent No.: US 7,063,505 B2
(45) Date of Patent: Jun. 20, 2006

(54) GAS TURBINE ENGINE FRAME HAVING STRUTS CONNECTED TO RINGS WITH MORSE PINS

(75) Inventor: Robert Paul Czachor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 10/360,678

(22) Filed: Feb. 7, 2003

(65) Prior Publication Data

US 2004/0156719 A1 Aug. 12, 2004

(51) Int. Cl.
F01D 1/02 (2006.01)

(52) U.S. Cl. .................. 415/209.4; 415/211.2

(58) Field of Classification Search .............. 415/142, 415/189, 190, 209.2, 209.4, 210.1, 211.2
See application file for complete search history.

(56) References Cited

U.S. PATENT DOCUMENTS

| | | | |
|---|---|---|---|
| 4,076,455 A | * | 2/1978 | Stargardter ............ 416/191 |
| 4,758,129 A | | 7/1988 | Strock et al. |
| 4,790,133 A | | 12/1988 | Stuart |
| 4,860,537 A | | 8/1989 | Taylor |
| 4,951,461 A | | 8/1990 | Butler |
| 4,976,102 A | | 12/1990 | Taylor |
| 5,307,622 A | | 5/1994 | Ciokajlo et al. |
| 5,361,580 A | | 11/1994 | Ciokajlo et al. |
| 5,443,590 A | | 8/1995 | Ciokajlo et al. |
| 5,848,874 A | * | 12/1998 | Heumann et al. ........... 415/189 |
| 5,921,749 A | | 7/1999 | McLaurin et al. |
| 6,338,611 B1 | | 1/2002 | Anderson et al. |

* cited by examiner

Primary Examiner—Edward K. Look
Assistant Examiner—Dwayne J. White
(74) Attorney, Agent, or Firm—William Scott Andes; Steven J. Rosen

(57) ABSTRACT

A gas turbine engine strut segment includes a strut, which may be hollow, extending radially between co-annular radially inner and outer platforms, axially spaced apart inner platform flanges extending radially inwardly from the inner platform, and axially spaced apart outer platform flanges extending radially outwardly from the inner platform. At least one inner set of coaxial tapered inner holes extend axially through the inner platform flanges and at least one outer set of coaxial tapered outer holes extend axially through the outer platform flanges. The inner set of coaxial inner holes define an inner conical surface and the outer set of coaxial outer holes define an outer conical surface. Each of the axial spaced apart platform flanges may be circumferentially continuous or scalloped having spaced circumferentially apart lugs. The strut may have two inner sets of coaxial tapered inner and outer holes extending axially through the inner and outer platform flanges, respectively.

24 Claims, 5 Drawing Sheets

GAS TURBINE ENGINE FRAME HAVING STRUTS CONNECTED TO RINGS WITH MORSE PINS

BACKGROUND OF THE INVENTION

1. Field of the Invention

The invention relates to gas turbine engine frames used to support bearings that support turbine rotors and, particularly, for static frames including inter-turbine frames and rotatable frames that are used in supporting counter-rotating low pressure turbine rotors.

2. Description of Related Art

A gas turbine engine of the turbofan type generally includes a forward fan and booster compressor, a middle core engine, and an aft low pressure power turbine. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some low pressure turbines have been designed with counter-rotating turbines that power counter-rotating fans and booster or low pressure compressors. U.S. Pat. Nos. 4,860,537, 4,758,129, 4,951,461, 5,307,622, 5,433,590 and 4,790,133 disclose counter-rotating turbines that power counter-rotating fans and booster or low pressure compressors. Most of the thrust produced is generated by the fan.

Engine frames including fan and turbine frames are used to support and carry the bearings which, in turn, rotatably support the rotors. Frames generally include struts, including struts with airfoil-shaped cross-sections, radially extending and mounted between co-annular radially inner and outer rings. Static aft turbine frames and inter-turbine frames are located at the aft end of the low pressure turbine and between high and low pressure turbines, respectively. Examples of static inter-turbine frames are disclosed in U.S. Pat. Nos. 4,976,102 and 5,483,792. The struts are generally cast because of the complexity of the flowpath through which the struts pass and because cast construction reduces manufacturing costs. Flowpath temperature is another reason for using cast alloy struts. Large modern commercial turbofan engines have higher operating efficiencies with higher bypass ratio configurations, larger transition ducts between low pressure and high pressure turbines. The frames, especially those located in the engine hot section, are complex and expensive.

Rotatable turbine frames are used in engine designs incorporating counter-rotating turbines. Examples of rotatable turbine frames are disclosed in U.S. Pat. Nos. 5,307,622, and 5,433,590. New commercial engine designs are incorporating counter-rotating rotors for improved turbine efficiency. The inner and outer rings, which carry the rotational loads, are generally made of a forged material due to forging materials exhibiting superior strength and fatigue characteristics. A need exists for engine frames, particularly in the hot turbine sections that will reduce engine length, weight, and cost.

Rotating frames will be subject to FAA LCF life limitation requirements, meaning that life to crack initiation must be calculated and the parts retired in revenue service at some fraction of that life. Alternatively, life may be established based on some probability of inherent defect propagation in the parts, depending on the material. The low fatigue properties of castings and the high level of defects inherent to the casting process make the design of a cast rotating frame with adequate service life difficult.

It is highly desirable to have a high temperature rotating frame construction that uses castings for the strut-airfoils and flowpath where the redundant nature of the components will allow them to be treated, for purposes of FAA certification, as turbine airfoils are now treated with respect to replacement for cause based on condition. It is highly desirable to use forging to construct the inner and outer load carrying rings. This will allow the rings to be treated as traditional rotating parts using traditional materials and manufacturing methods. It is also highly desirable for the rotatable frame to have a dynamically stiff structure with adequate strength, all while being mechanically simple for reasons of manufacturing cost and serviceability.

SUMMARY OF THE INVENTION

A gas turbine engine strut segment includes a strut extending radially between co-annular radially inner and outer platforms, axially spaced apart inner platform flanges extending radially inwardly from the inner platform, and axially spaced apart outer platform flanges extending radially outwardly from the inner platform. At least one inner set of coaxial tapered inner holes extend axially through the inner platform flanges and at least one outer set of coaxial tapered outer holes extend axially through the outer platform flanges. The inner set of coaxial inner holes define an inner conical surface and the outer set of coaxial outer holes define an outer conical surface. Each of the axial spaced apart flanges may be circumferentially continuous or circumferentially scalloped and have spaced circumferentially apart lugs. In one exemplary embodiment of the strut segment, the strut is hollow and there are two inner sets of coaxial tapered inner holes extending axially through the inner platform flanges and two outer sets of coaxial tapered outer holes extend axially through the outer platform flanges. The strut segment may be made from a casting.

The strut segment is designed for use in a gas turbine engine frame having concentric radially spaced apart inner and outer rings. Axially spaced apart inner ring flanges extend radially outwardly from the inner ring and axially spaced apart outer platform flanges extend radially inwardly from the outer ring. A plurality of strut segments extend between and are connected to the inner and outer rings. The axially spaced apart inner platform flanges of the strut segments extend radially inwardly from the inner platform and are interdigitated with the inner ring flanges. The axially spaced apart outer platform flanges which extend radially outwardly from the inner platform are interdigitated with the outer ring flanges. At least one inner set of coaxial tapered inner holes extend axially through the inner platform and ring flanges and at least one outer set of coaxial tapered outer holes extend axially through the outer platform and ring flanges. The inner set of coaxial inner holes define an inner conical surface and the outer set of coaxial outer holes define an outer conical surface. Inner and outer pins having tapered conical inner and outer shanks are disposed though the inner and outer sets of coaxial inner and outer holes, respectively.

In one exemplary embodiment of the frame, the struts are hollow. There are two inner and outer sets of coaxial tapered inner and outer holes extending axially through the inner and outer platform and ring flanges and at least one outer set of coaxial tapered outer holes extend axially through the outer platform and ring flanges, respectively. There are two sets of inner and outer pins having tapered conical inner and outer shanks disposed though the inner and outer sets of coaxial inner and outer holes, respectively.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
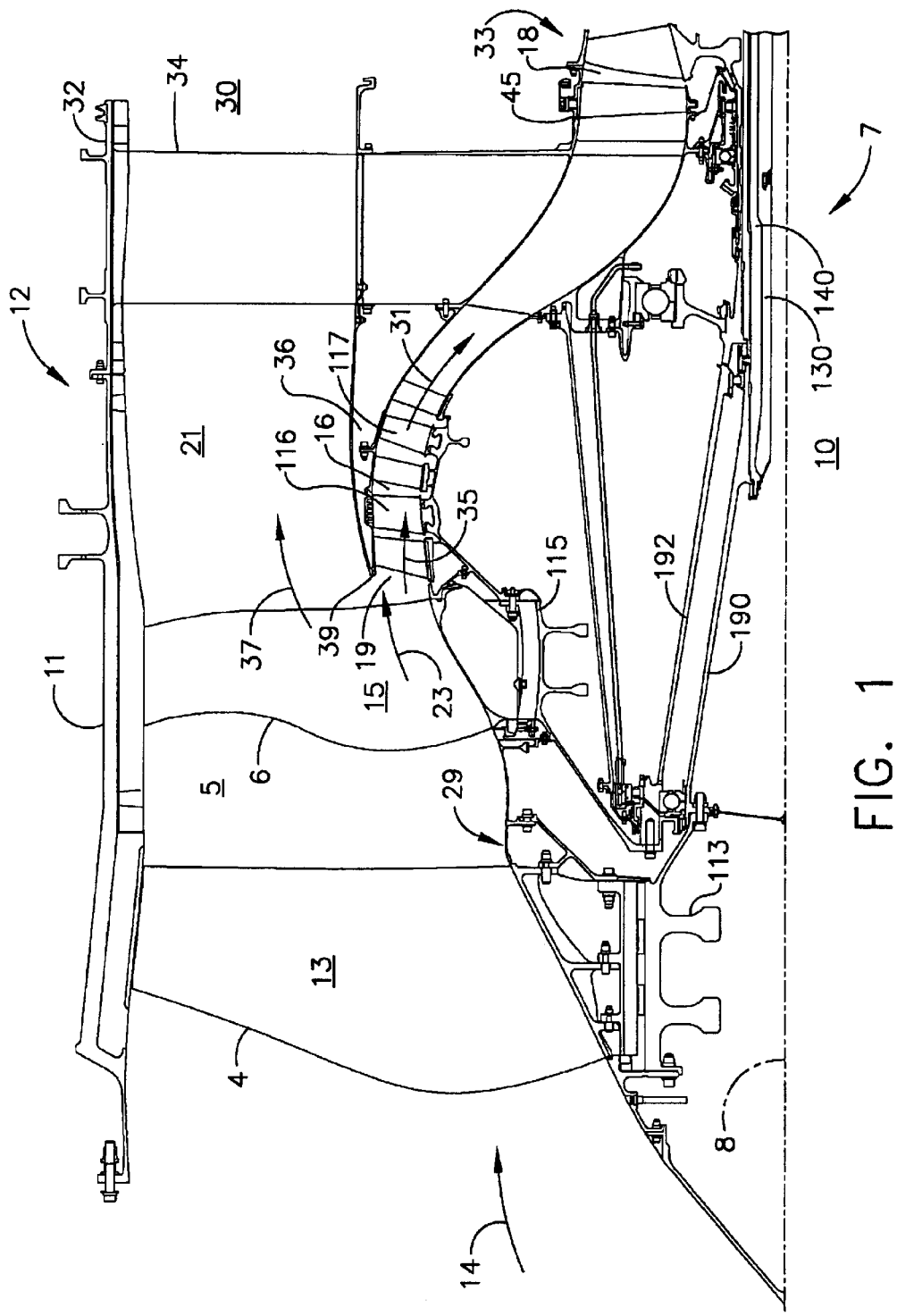
FIG. 1 is a longitudinal sectional view illustration of a forward portion of an exemplary embodiment of an aircraft turbofan gas turbine engine with a counter-rotating low pressure turbine having a counter-rotating turbine frame including rotating struts connected to inner and outer platforms by tapered morse pin connections.

Illustrated in FIG. 1 is a forward portion 7 of an exemplary turbofan gas turbine engine 10 circumscribed about an engine centerline 8 and having a fan section 12 which receives inlet airflow of ambient air 14. The engine 10 has a frame structure 32 which includes a forward or fan frame 34 connected by engine casing 45 to a turbine center frame 60 and a turbine aft frame 155 illustrated in FIG. 2. The engine 10 is mounted within or to an aircraft such as by a pylon (not illustrated) which extends downwardly from an aircraft wing.

The fan section 12 has counter-rotating forward and aft fans 4 and 6, including forward and aft blade rows 13 and 15, mounted on forward and aft fan disks 113 and 115, respectively. A single direction of rotation booster 16 is located aft and downstream of the forward and aft blade rows 13 and 15 and is drivingly connected to the aft fan disk 115 and is thus rotatable with the aft fan 6 and aft blade row 15. Counter-rotational boosters may also be used. The booster 16 is illustrated in FIG. 1 with first and second rows of booster blades 116 and 117.

The forward and aft fan blade rows 13 and 15 extend radially outwardly from the forward and aft fan disks 113 and 115, respectively, and extend across a fan duct 5 radially outwardly bounded by a fan casing 11 and radially inwardly bounded by an annular radially inner duct wall 29. The first and second rows of booster blades 116 and 117 are radially disposed within a core engine inlet 19 surrounded by a core engine inlet shroud 36 having an inlet duct splitter 39.

Figure 2:
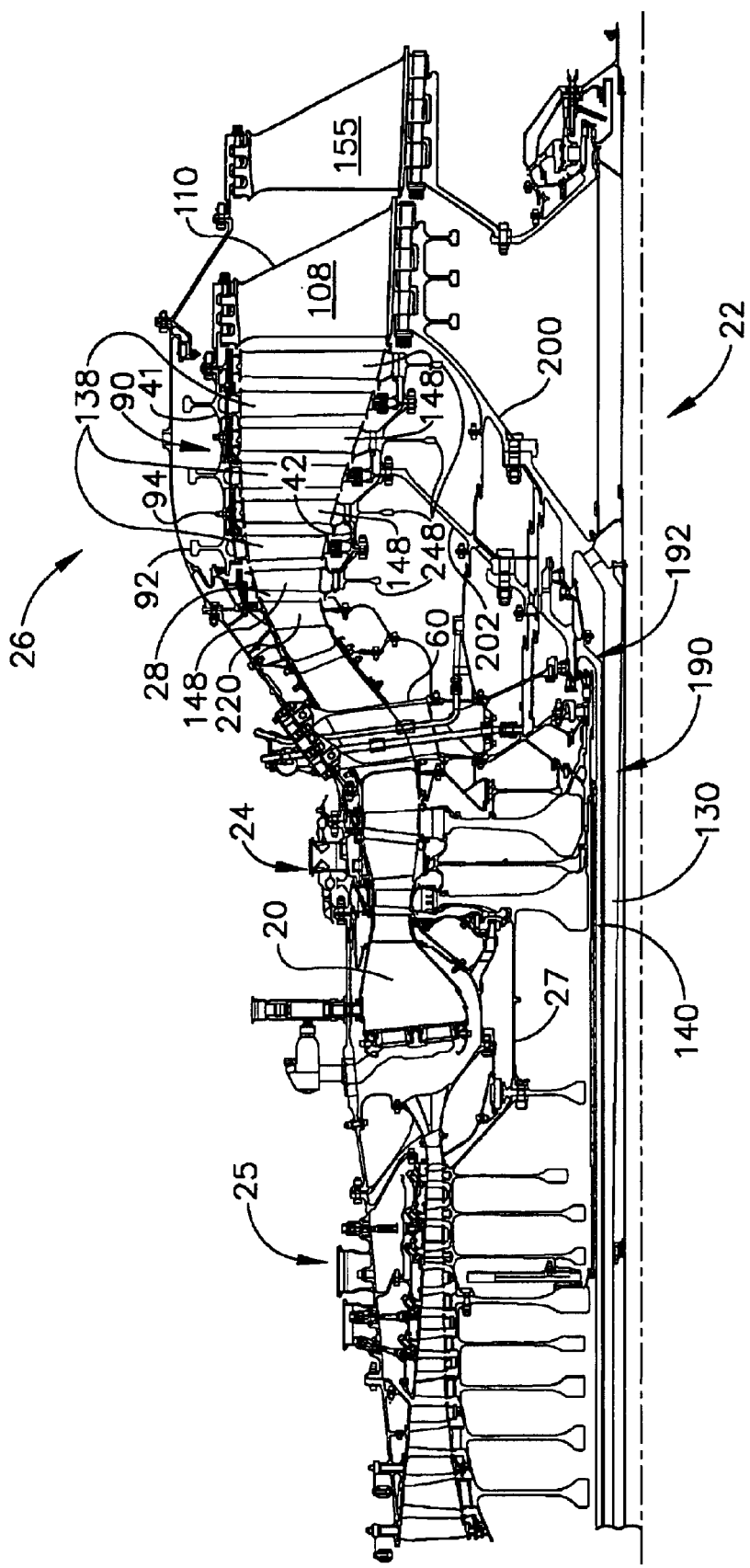
FIG. 2 is a longitudinal sectional view illustration of an exemplary embodiment of an aft engine portion of the engine illustrated in FIG. 1 and the counter-rotating turbine frame and rotating struts connected to the inner and outer platforms by the tapered morse pin connections.

Downstream and axially aft of the fan section 12 is a high pressure compressor (HPC) 18 which is further illustrated in FIG. 2. FIG. 2 schematically illustrates an aft portion 22 of the engine 10. Downstream of the HPC 18 is a combustor 20 which mixes fuel with the air 14 pressurized by the HPC 18 for generating combustion gases which flow downstream through a high pressure turbine (HPT) 24, and a counter-rotating low pressure turbine (LPT) 26, also referred to as a power turbine, from which the combustion gases are discharged from the engine 10. A high pressure shaft 27 joins the HPT 24 to the HPC 18 to substantially form a first or high pressure spool 33 (also referred to as a high pressure rotor). The high pressure compressor 18, combustor 20, and high pressure turbine 24, collectively are referred to as a core engine 25 which includes, for the purposes of this patent, the high pressure shaft 27.

Referring back to FIG. 1, a bypass duct 21 is radially outwardly bounded by the fan casing 11 and radially inwardly bounded by the core engine inlet shroud 36. The forward and aft fan blade rows 13 and 15 are disposed within the duct 5 upstream of the bypass duct 21. The inlet duct splitter 39 splits fan flow air 23 exiting the aft fan blade row 15 into a fan flow air first portion 35 into the booster 16 and a fan flow air second portion 37 around the booster 16 into the bypass duct 21 where it then exits the fan section 12 through a fan exit 30 providing thrust for the engine. The fan flow air first portion 35 is pressurized by the booster 16 to form booster air 31 and exits the booster into the high pressure compressor 18 of the core engine 25.

Referring again to FIG. 2, the low pressure turbine 26 includes a low pressure turbine flowpath 28. The low pressure turbine 26 includes counter-rotatable low pressure inner and outer shaft turbines 41 and 42 having low pressure inner and outer shaft turbine rotors 200 and 202, respectively. The low pressure inner and outer shaft turbine rotors 200 and 202 include low pressure first and second turbine blade rows 138 and 148, respectively, disposed across the low pressure turbine flowpath 28. Counter-rotatable low pressure inner spool 190 includes the low pressure inner shaft turbine rotor 200 drivingly connected to the forward fan blade row 13 by a low pressure inner shaft 130. Counter-rotatable low pressure outer spool 192 includes the low pressure outer shaft turbine rotor 202 drivingly connected to the aft fan blade row 15 by a low pressure outer shaft 140.

The low pressure inner and outer shafts 130 and 140 are at least in part rotatably disposed co-axially with and radially inwardly of the high pressure spool 33. In the exemplary embodiment illustrated in FIG. 2, there are four rows each of the low pressure first and second turbine blade rows 138 and 148. The booster 16 is drivingly connected to the low pressure outer shaft 140 and is part of the low pressure outer spool 192. A turbine nozzle 220 is disposed axially forward, upstream of, and adjacent to the second low pressure turbine blade rows 148.

The low pressure inner and outer shaft turbines 41 and 42 are interdigitated and the first low pressure turbine blade rows 138 are interdigitated with the second low pressure turbine blade rows 148. The low pressure inner and outer shaft turbines 41 and 42 illustrated in FIG. 2 have four second low pressure turbine blade rows 148 and four first low pressure turbine blade rows 138, respectively. All of the second low pressure turbine blade rows 148 are interdigitated with the first low pressure turbine blade rows 138.

The low pressure inner shaft turbine 41 has an aftmost or fourth row 110 of the first low pressure turbine blade rows 138. The aftmost row of the first low pressure turbine blade rows 138 also serve as rotating struts 62 (illustrated in FIG. 3) in a rotating frame 108 which supports a radially outer turbine ring assembly 90 and is rotatably supported by the center frame 60 and the turbine aft frame 155. The radially outer turbine ring assembly 90 has three separate turbine rotor rings 92 from which the first three first low pressure turbine blade rows 138 are supported respectively. The turbine rotor rings 92 are connected together by bolted connections 94. The low pressure outer shaft turbine rotor 202 is illustrated as having the four second low pressure turbine blade rows 148 mounted on the low pressure second turbine disks 248.

Figure 3:
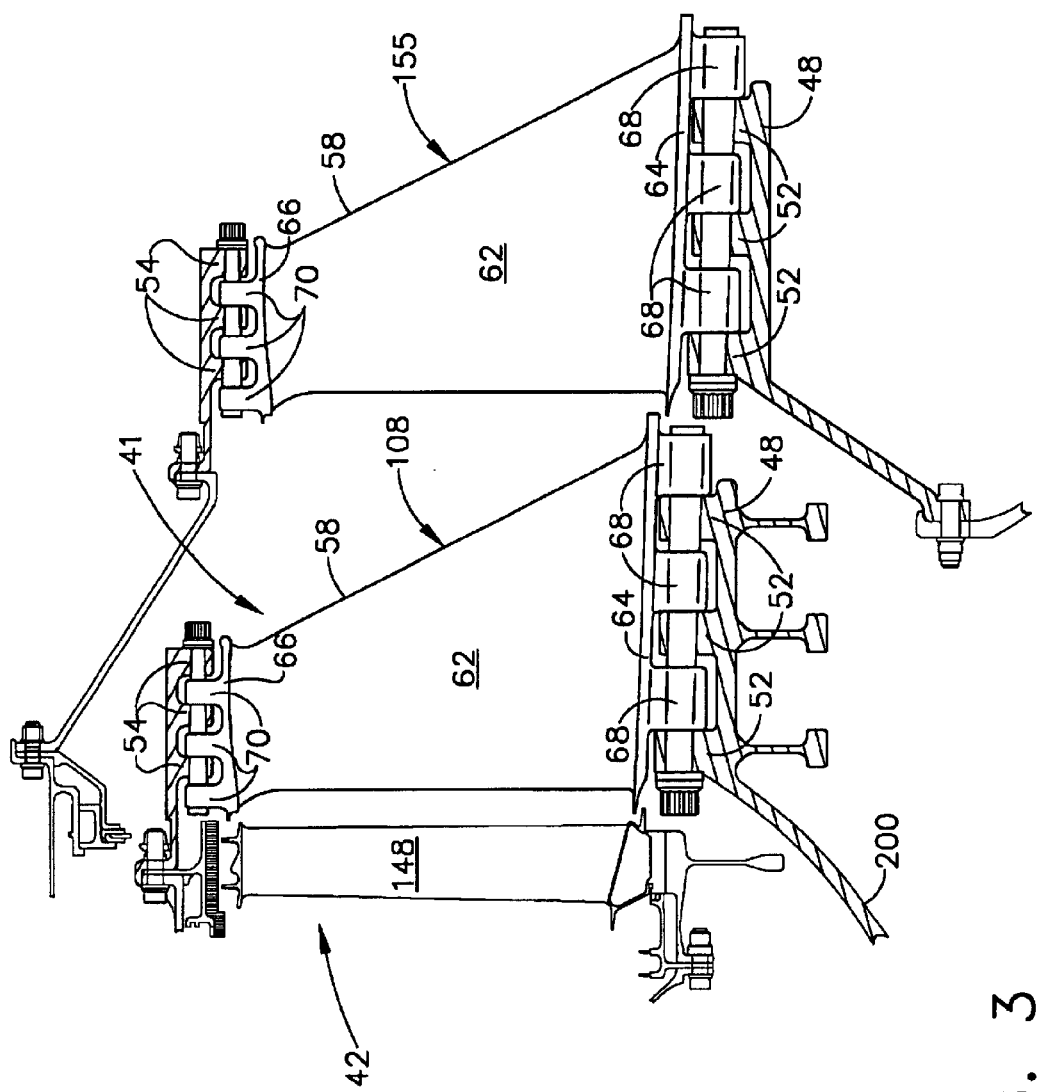
FIG. 3 is an enlarged view illustration of one the rotating struts connected to the inner and outer platforms by the tapered morse pin connections and a non-rotating strut connected to inner and outer platforms by tapered morse pin connections illustrated in FIG. 2.
Figure 4:
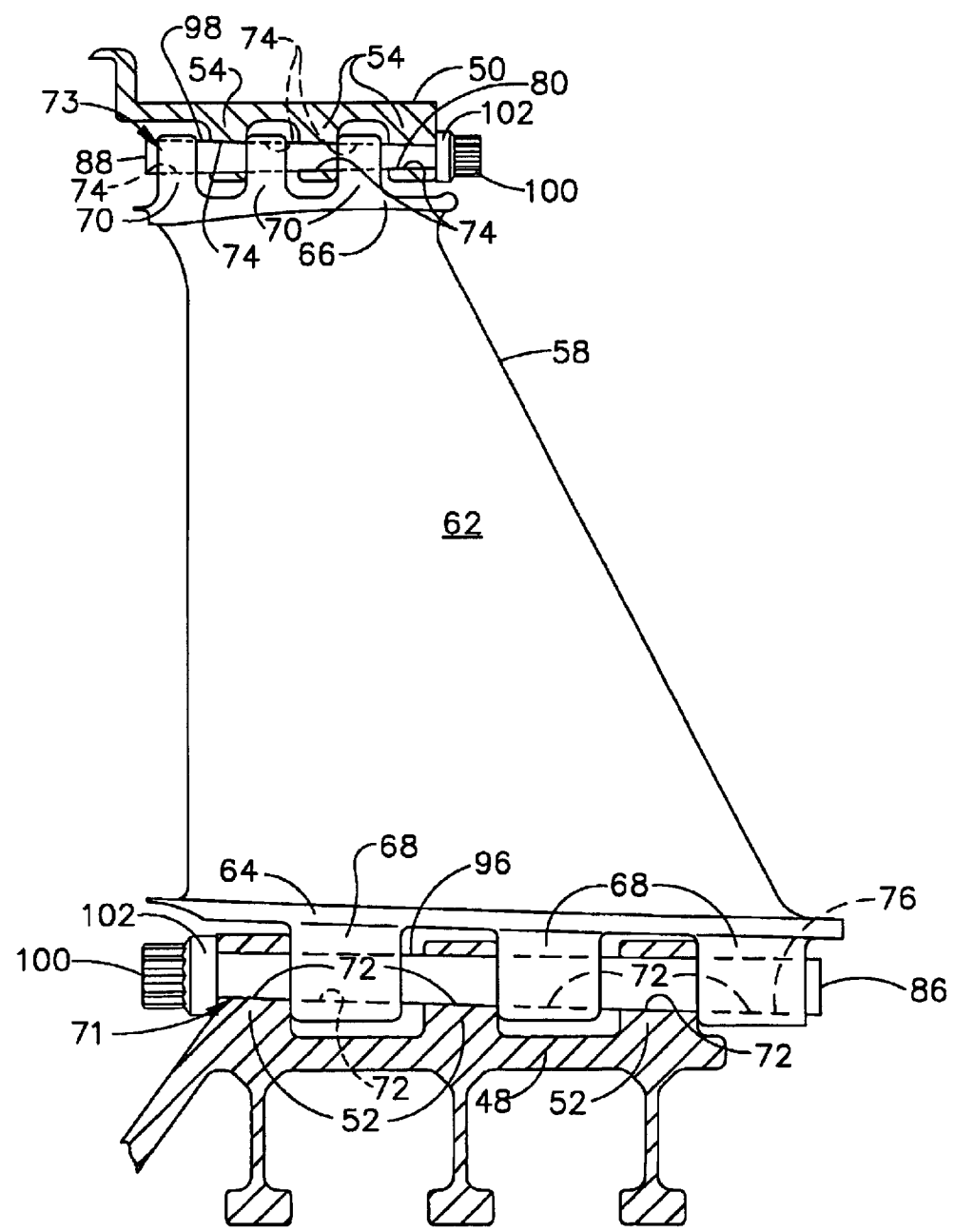
FIG. 4 is an enlarged view illustration of one the rotating struts connected to the inner and outer platforms by the tapered morse pin connections illustrated in FIG. 3.
Figure 5:
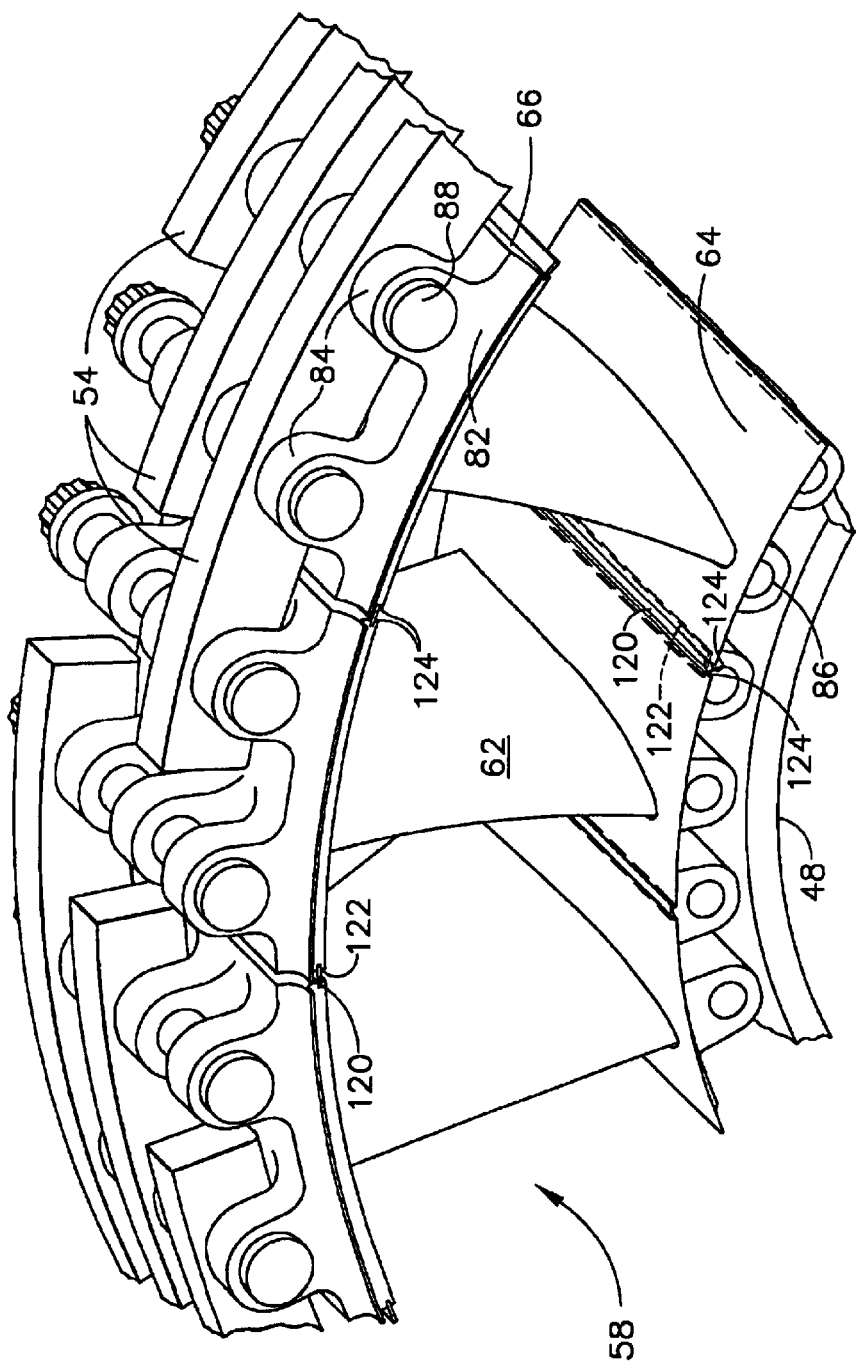
FIG. 5 is forward looking aft view illustration of the struts connected to the inner and outer platforms by the tapered morse pin connections illustrated in FIG. 3.

The turbine aft frame 155 and the rotating frame 108 are illustrated as being constructed of concentric radially spaced apart inner and outer rings 48 and 50 as illustrated in FIGS. 3, 4, and 5. Axially spaced apart inner ring flanges 52 extend radially outwardly from the inner ring 48 and axially spaced apart outer ring flanges 54 extend radially inwardly from the outer ring 50. The inner and outer ring flanges 52 and 54 are circumferentially continuous as illustrated for the outer ring flanges 54 in FIG. 5. A plurality of strut segments 58 extend between and are connected to the inner and outer rings 48 and 50. Each strut segment 58 includes a strut 62 extending radially between co-annular radially inner and outer platforms 64 and 66. The struts 62 may be hollow or solid.

Axially spaced apart inner platform flanges 68 extend radially inwardly from the inner platform 64, and axially spaced apart outer platform flanges 70 extend radially outwardly from the outer platform 66. At least one inner set 71 of coaxial tapered inner holes 72 extend axially through the inner platform flanges 68 and at least one outer set 73 of coaxial tapered outer holes 74 extend axially through the outer platform flanges 70. The inner set 71 of coaxial tapered inner holes 72 define an inner conical surface 76 and the outer set 73 of coaxial tapered outer holes 74 define an outer conical surface 80.

Each of the axial spaced apart inner and outer platform flanges 68 and 70 may be circumferentially continuous or circumferentially scalloped. Circumferentially scalloped outer platform flanges 82 having circumferentially spaced apart lugs 84 are illustrated in FIG. 5. In the exemplary embodiment of the strut segment 58 illustrated in FIGS. 3–5, the strut 62 is hollow and there are two inner sets 71 of coaxial tapered inner holes 72 extending axially through the inner platform flanges 68 and two outer sets 73 of coaxial tapered outer holes 74 extend axially through the outer platform flanges 70.

The axially spaced apart inner platform flanges 68 of the strut segments extend radially inwardly from the inner platform 64 and are interdigitated with the inner ring flanges 52. The axially spaced apart outer platform flanges 70 which extend radially outwardly from the outer platform 66 are interdigitated with the outer ring flanges 54. The inner sets 71 of the coaxial tapered inner holes 72 extend axially through the inner platform and ring flanges 64 and 52 and the outer sets 73 of the coaxial tapered outer holes 74 extend axially through the outer platform and ring flanges 70 and 54. The inner sets 71 of the coaxial inner holes 72 define the inner conical surface 76 and the outer sets of coaxial outer holes 74 define the outer conical surface 80.

Inner and outer pins 86 and 88 have tapered conical inner and outer shanks 96 and 98 disposed though the inner and outer sets 71 and 73 of coaxial inner and outer holes 72 and 74, respectively. The inner and outer pins 86 and 88 are tightened by threaded nuts 100 tightened on relatively narrow threaded ends 102 of the tapered conical inner and outer shanks 96 and 98. The conical shanks of the pins fitted into the conical holes are often referred to as morse pin connections.

The exemplary embodiment of the turbine aft frame 155 and the rotating frame 108 have strut segments 58 made from a one piece, unitary castings and forged inner and outer rings 48 and 50. The cast strut segments 58 have good thermal characteristics and have low cost and are easily replaced. The forged inner and outer rings 48 and 50 have good fatigue and good service life properties. The combination of the cast strut segments 58 and the forged inner and outer rings 48 and 50 can provide fixed and rotatable frames having a dynamically stiff structure with adequate strength and being mechanically simple for reasons of manufacturing cost and serviceability. Spline seals 120 disposed in axially extending slots 122 in circumferential edges 124 of the inner and outer platforms 64 and 66 may be used to prevent flowpath gas from reaching the inner and outer rings between adjacent inner platforms 64 and between adjacent outer platforms 66.

The inner and outer pins 86,88 are illustrated as being parallel to the engine centerline 8. Alternative arrangements may have the inner and outer pins 86,88 canted or angled with respect to the engine centerline 8. The inner and outer pins 86,88 and the inner and outer sets 71,73 of the coaxial inner and outer holes 72,74 respectively are illustrated as being tapered down in an aftwardly direction. Alternative embodiments of the strut segments 58 and static and rotating frames may have the inner and outer pins 86,88 and the inner and outer sets 71,73 of the coaxial inner and outer holes 72,74 respectively tapered down in a forwardly direction. Alternatively the taper of the pins and holes can be alternated such that circumferentially adjacent sets of holes and the pins disposed within those holes taper down in different axial directions, either aftwardly or forwardly. Two inner and outer pins 86,88 in each of the inner and outer sets 71,73 are illustrated herein, but a larger number may be be used, depending on the airfoil solidity. A single strut is illustrated in each of the strut segments 58 but multiple struts may be used. Field replacement of a damaged or distressed individual strut may be accomplished by match re-machining of the replacement strut airfoil to the rings and the use of slightly oversized pins.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine strut segment comprising:
   a strut extending radially between co-annular radially inner and outer platforms, axially spaced apart inner platform flanges extending radially inwardly from the inner platform, axially spaced apart outer platform flanges extending radially outwardly from the outer platform, and at least one inner set of coaxial tapered inner holes extending axially through the inner platform flanges, at least one outer set of coaxial tapered outer holes extending axially through the outer platform flanges, the inner set of coaxial inner holes define an inner conical surface, and the outer set of coaxial outer holes define an outer conical surface.

2. A strut segment as claimed in claim 1, wherein each of the axial spaced apart platform flanges is circumferentially continuous.

3. A strut segment as claimed in claim 1, wherein each of the axial spaced apart platform flanges is circumferentially scalloped having spaced circumferentially apart lugs.

4. A strut segment as claimed in claim 1, wherein the strut is hollow.

5. A strut segment as claimed in claim 4, wherein each of the axial spaced apart platform flanges is circumferentially continuous.

6. A strut segment as claimed in claim 4, wherein each of the axial spaced apart platform flanges is circumferentially scalloped having spaced circumferentially apart lugs.

7. A strut segment as claimed in claim 1, wherein the strut segment is made from a casting.

8. A strut segment as claimed in claim 7, wherein each of the axial spaced apart platform flanges is circumferentially continuous.

9. A strut segment as claimed in claim 7, wherein each of the axial spaced apart platform flanges is circumferentially scalloped having spaced circumferentially apart lugs.

10. A strut segment as claimed in claim 7, wherein the strut is hollow.

11. A strut segment as claimed in claim 10, wherein each of the axial spaced apart platform flanges is circumferentially continuous.

12. A strut segment as claimed in claim 10, wherein each of the axial spaced apart platform flanges is circumferentially scalloped having spaced circumferentially apart lugs.

13. A gas turbine engine frame comprising:

concentric radially spaced apart inner and outer rings, axially spaced apart inner ring flanges extending radially outwardly from the inner ring, axially spaced apart outer ring flanges extending radially inwardly from the outer ring, a plurality of strut segments extending between and connected to the inner and outer rings, each of the strut segments having a strut extending radially between co-annular radially inner and outer platforms, axially spaced apart inner platform flanges extending radially inwardly from the inner platform and interdigitated with the inner ring flanges, axially spaced apart outer platform flanges extending radially outwardly from the outer platform and interdigitated with the outer ring flanges, and at least one inner set of coaxial tapered inner holes extending axially through the inner platform and ring flanges, at least one outer set of coaxial tapered outer holes extending axially through the outer platform and ring flanges, the inner set of coaxial inner holes define an inner conical surface, the outer set of coaxial outer holes define an outer conical surface, and inner and outer pins having tapered conical inner and outer shanks disposed though the inner and outer sets of coaxial inner and outer holes respectively.

14. A frame as claimed in claim 13, wherein each of the axial spaced apart platform flanges is circumferentially continuous.

15. A frame as claimed in claim 13, wherein each of the axial spaced apart platform flanges is circumferentially scalloped having spaced circumferentially apart lugs.

16. A frame as claimed in claim 13, wherein the strut is hollow.

17. A frame as claimed in claim 16, wherein each of the axial spaced apart platform flanges is circumferentially continuous.

18. A frame as claimed in claim 16, wherein each of the axial spaced apart platform flanges is circumferentially scalloped having spaced circumferentially apart lugs.

19. A frame as claimed in claim 13, wherein the strut segments are made from castings and the inner and outer rings are made from forgings.

20. A frame as claimed in claim 19, wherein each of the axial spaced apart platform flanges is circumferentially continuous.

21. A frame as claimed in claim 20, wherein each of the axial spaced apart platform flanges is circumferentially continuous.

22. A frame as claimed in claim 19, wherein each of the axial spaced apart platform flanges is circumferentially scalloped having spaced circumferentially apart lugs.

23. A frame as claimed in claim 19, wherein the struts are hollow.

24. A frame as claimed in claim 23, wherein each of the axial spaced apart platform flanges is circumferentially scalloped having spaced circumferentially apart lugs.

* * * * *